Nov. 19, 1968   J. P. CHISHOLM   3,412,399
MOBILE UNIT RANGING SYSTEM
Filed Dec. 29, 1966   2 Sheets-Sheet 1

INVENTOR
JOHN P. CHISHOLM

BY Alexander & Dowell
ATTORNEYS

United States Patent Office 3,412,399
Patented Nov. 19, 1968

3,412,399
MOBILE UNIT RANGING SYSTEM
John P. Chisholm, Rte. 1, Koloa,
Kauai, Hawaii 96756
Filed Dec. 29, 1966, Ser. No. 605,854
17 Claims. (Cl. 343—6.5)

ABSTRACT OF THE DISCLOSURE

A method and system for accurately determining range between plural units using pulse techniques and omnidirectional antennas, without requiring precise phase synchronization of time clocks in the various units, each unit transmitting its own marker signal at a unique moment in a recurring cycle, each marker signal being at the same time an interrogation of all other units and a reply to all other units, and each marker signal being followed by telemetered data addressed to specific other units for telling them how much delay occurred between the transmission of the present marker signal and the receipt of their specific marker signals.

The invention

The invention relates to a method and system for determining the mutual range among a plurality of units, for instance including aircraft and ground stations, wherein some or all of the units are vehicles whose range is a variable comprising the unknown which the present system seeks to determine.

There have been a number of systems proposed in the prior art for accomplishing this purpose and most of these systems have been based either upon a direct measurement of range by a roundtrip pulse system such as a radar system or a transponder system, or alternatively have been based upon a so-called one-way ranging system in which all of the units have time clocks which are very accurately synchronized so that when each of the units transmits its ranging signal, all the other units can determine range to the transmitting unit by measuring the elapsed time between the known moment of transmission and the time when the transmitted signal was received at the remote unit. Both of these prior art approaches have suffered from serious disadvantages. The radar-echo approach has the disadvantage of requiring either a directional antenna at each unit so that it can interrogate remote units selectively, or else each remote unit must be otherwise uniquely interrogated and must then respond to such interrogation in an identifiable manner, such a system being rather slow and cumbersome as between a substantial number of participating units because of the infrequency with which any unit can interrogate any other unit and because an interval must be allowed after each interrogation at least equal to the maximum two-way propagation time to await a response, whereby information is gathered by a large number of units at a rather slow rate. On the other hand, the one-way ranging system provides reduced density of interrogation and reply signals and increased frequency at which information is gathered, but all of this is accomplished at the expense of requiring extremely accurate time clock synchronization in view of the fact that all clock errors are translated directly into range measurement errors. Moreover, in a one-way ranging system the complexity of the pulse handling systems is tremendously increased at each unit as a result of the fact that a large proportion of the available time for transmission and reception of pulses is used for the ancillary purpose of maintaining clock synchronization, rather than for the principle purpose of measuring and processing range information. The present state of the art with regard to time clocks is such that extreme accuracy without frequency synchronization is available only from very sophisticated clocks such as atomic clocks, which are not only expensive but bulky at the present time. A lesser clock, such as one employing a good crystal oscillator, provides accuracy of only about $10^{-8}$, so that if such a clock is set at the beginning of a six hour flight it would accumulate considerable error during that flight, and such error would be too great to permit the use of the prior art one-way ranging technique on a practical basis without frequent resynchronization. On the other hand, this $10^{-8}$ crystal oscillator error is not so great as to prevent the use of clocks of this degree of accuracy for the more limited purpose of maintaining broad time slots with a satisfactory degree of accuracy in a system in which the measurement of range is not dependent upon phase synchronization of the various clocks, as will be set forth hereinbelow.

It is the principal object of this invention to provide a method and system for ranging between mobile units in which time clocks in the individual units need not be accurately phase synchronized, but are required to have only sufficient short-term accuracy that the error in time as measured over the duration of less than a second becomes negligible. The present invention preserves to a great extent the advantages of a one-way ranging system while at the same time using clocks of only fairly good accuracy, however without requiring a master clock, a phase synchronized time base, or periodic clock oscillator resetting.

It is another major object of this invention to provide a system in which the various units transmit sequentially during separate repeating intervals, during which interval each unit transmits a single marker signal preferably comprising a coded group of pulses, with respect to which all measurements are made by all other units when determining their relative ranges to the transmitting unit. In addition, during its own interval each unit telemeters enough data referenced to the moment of transmission of its own marker signal that other units receiving the marker signal and the accompanying telemetered data can determine their range to it using the data telemetered plus the local information derived exclusively from their own time clocks.

It is a further object of the present invention to implement the above ranging techniques in a system where no assigned time slots whatever are necessary and in which it is only necessary that each aircraft transmit during an interval which is not occupied by another aircraft, leaving sufficient guard space between such transmissions to avoid overlap. This is the type of system in which a unique sequence is randomly established as between plural aircraft flying into and out of radio range with other aircraft. A good example of this type of system is disclosed in my Patent No. 3,161,869, assigned to Sierra Research Corporation.

Onother object of this invention is to provide a system in which data storage capability is provided in each unit for storing the time of arrival data with respect to as many other units as are expected to be within range at any single moment of time, such capability further serving to store identities of the other units to which such data relates and the system including means for performing simple addition and/or subtraction of stored clock times in order to calculate such useful information as delay times and pulse propagation or transit times between units (ranges).

A further object of the invention is to provide a way of ranging between units wherein the various units each transmits its own maker signal during a uniquely occupied interval in a repeating time cycle, and also transmits to ach other unit within range an identification of the other unit being responded to plus the amount of time delay between receipt of the other unit's last marker signal and the present transmission of its own marker signal, thereby specifically providing each other unit with all the information it needs for the purpose of determining range to the transmitting unit without having its clock phase synchronized therewith.

Still another object of the invention is to provide a slightly modified way of ranging between units wherein the various units each transmits its own marker signal during a unique interval in a repeating sequence as well as the reading of its own time clock when its own marker signal was transmitted, and in addition its also transmits to each other unit within range the identity of the other unit being responded to plus the reading of the responding unit's time clock at the earlier instant when it received the other unit's marker signal, thus permitting the other unit to determine (by subtracting these two clock telemetered readings) the amount by which the transmitting unit delayed its response to that unit.

It is a further object, based on the operation set forth in the preceding paragraph, to provide a system in which all other units, by simply listening to the telemetered exchange of clock readings and marker signals between the above two units can determine the range between them, since all instants of pulse transmissions and receptions are tagged with the local clock readings. This operation is somewhat more complex, but it enjoys the advantage that each aircraft in a system can now determine the range between all other aircraft within radio range so that they are enabled to display an over-all picture of the distribution of aircraft in the vicinity, whereby the system will be compatible when used in connection with my Matrix Navigation System as set forth in co-pending application Ser. No. 589,698, filed Oct. 26, 1966.

Still another object of this invention is to provide a subsystem for measuring range with a much higher degree of accuracy than is afforded by most prior-art systems. There are two types of errors between remotely located time clocks. There are relatively small short-term errors resulting from the fact that such clocks really do not run at precisely the same rate. Over a brief period of time these errors are negligible. However, there are large errors between the phases of the time intervals counted out by two clocks, aggrevated by the fact that these errors integrate with time and are cumulative. It is, however, interesting to note that after accurate ranges have once been established it becomes relatively simple to phase synchronize all participating clocks since all of the data necessary to accomplish such synchronization is available at each unit as a result of the above-mentioned telemetering of times of arrival therebetween.

Other objects and advantages of this invention will become apparent during the following discussion of the drawings, wherein.

Figures 1, 2:
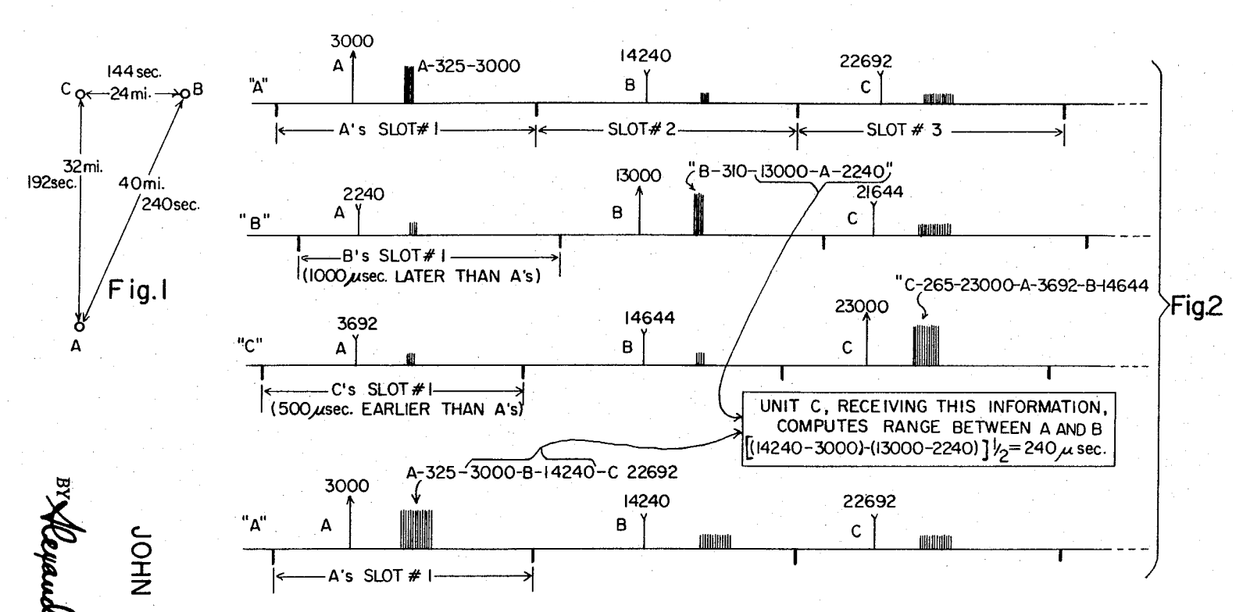
FIG. 1 is a diagram showing the mutual orientation and range between three units functioning according to the present invention.
FIG. 2 is a pulse timing diagram showing pulse signals and telemetering occurring during portions of the respective local time bases for said three units, with corresponding actual instants of time columnized.
Figure 3:
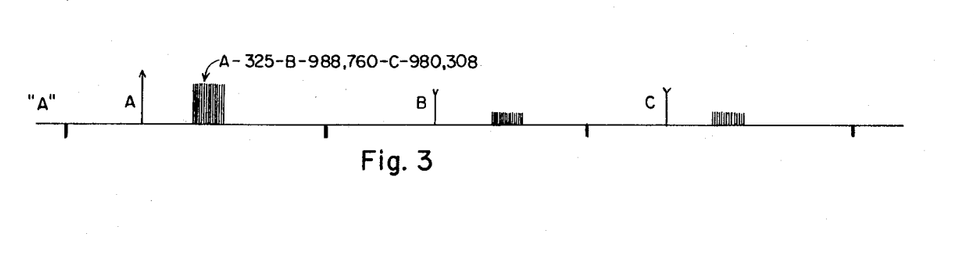
FIG. 3 is a timing diagram similar to the lower portion of FIG. 2, but showing a modified form of telemetering.
Figure 4:
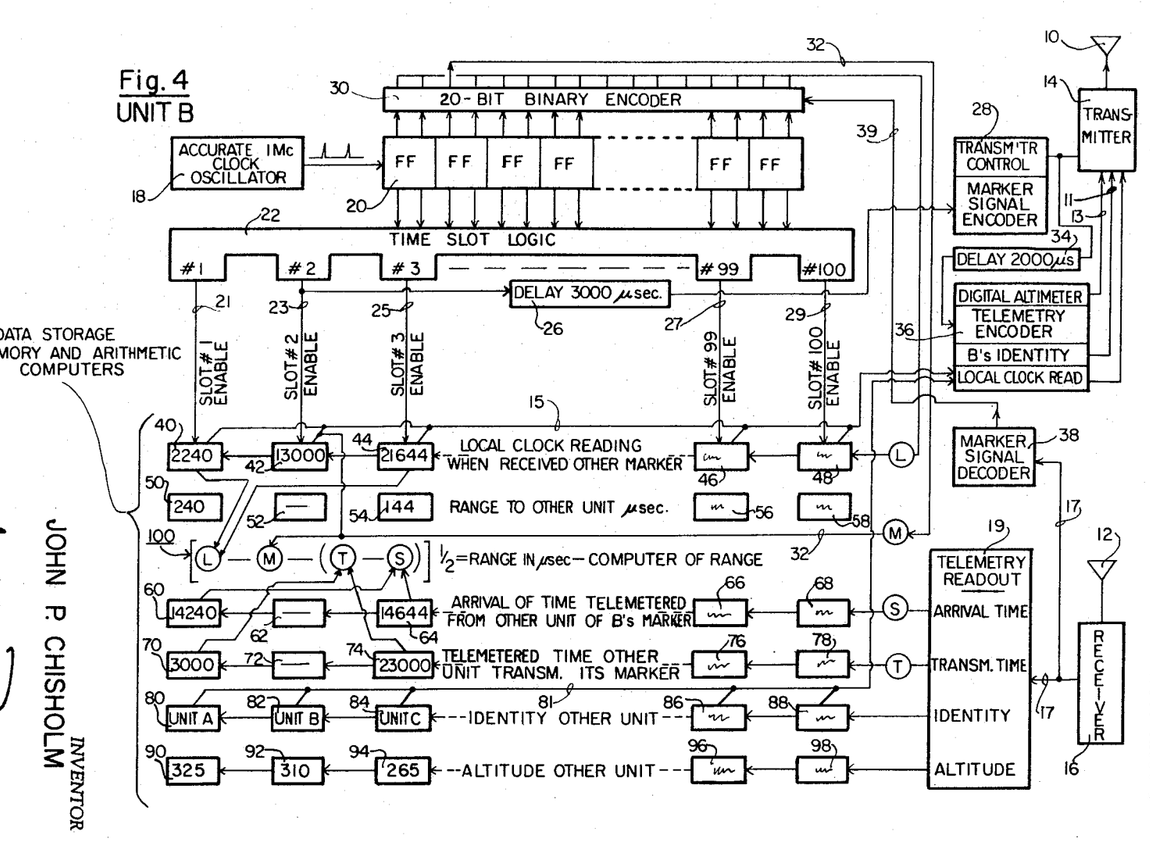
FIG. 4 is a functional diagram illustrating the operation of a typical unit, namely unit B.

Referring now to the drawings, FIG. 1 illustrates the case in which three units, for instance aircraft, are located remotely with respect to each other, these units including A, B, and C. This illustration selects the actual slant range between A and B as 40 miles, and (assuming approximately six microseconds per mile as the propagation rate) the one-way propagation time between A and B would be 240 microseconds. The slant range between B and C is assumed to be 24 miles, or 144 microseconds; and the slant range between A and C is assumed to be 32 miles, or 192 microseconds. These ranges and propagation times will be used in describing a numerical example of the system as illustrated in FIGS. 2, 3 and 4.

The present invention is based upon the fact that when an aircraft transmits its marker pulse and later receives a reply, both at times which are accurately measured according to its own local time clock, it becomes capable of measuring the range to another unit with great accuracy provided it can receive information from the other unit which will enable it to determine how much of the elapsed time between the transmission and the receipt of a reply is due to two-way propagation time, based on its own time clock's information. There are three delays involved, namely the propagation time to the other unit, the propagation time of the reply from the other unit (these two being equal), and the delay between the time the other unit receives the first unit's pulse and the time it initiates its reply thereto. Therefore, if an aircraft transmits its marker pulse and later receives a marker pulse from another aircraft, it can determine its range to the other aircraft if the latter informs it as to how long the other aircraft delayed responding to its pulse. According to the present invention, each aircraft transmits just one marker pulse during its own unique transmission interval (whether assigned or merely assumed according to the above-mentioned Patent No. 3,161,869). According to the present invention, that single coded marker pulse which each unit transmits constitutes at the same time both an interrogation to all other aircraft within its range and also a reply to all the pulses sent out by all other aircraft within its range. This is accomplished by accompanying each marker pulse transmitted by the aircraft with additional telemetered information, for instance transmitted subsequent to the marker pulse by binary encoded messages specifically addressed to each other unit within range.

For example, after the first aircraft transmits its marker pulse this pulse is received at a remote aircraft, and the time of arrival thereof is noted in the remote aircraft according to its own time clock. The remote aircraft then awaits its unique operating interval, and when the time arrives according to the remote aircraft's clock, it transmits its own marker pulse which is later received at the first aircraft. The remote unit also telemeters a message informing the first aircraft of the delay time between reception of the first aircraft's pulse and the transmission of the remote aircraft, because the total elapsed time becraft can then use the time of arrival of the remote aircraft's marker pulse plus the delay message specifically addressed to the first aircraft to determine the exact range to the remote aircraft, because the total elapsed time between the transmission at the first aircraft of its own marker pulse and the reception at the first aircraft of the remote aircraft's marker pulse is equal to twice the range propagation time therebetween plus the telemetered delay introduced at the remote aircraft (between reception of the first aircraft's signal and the transmission of the remote aircraft's own marker signal). The first aircraft measures said total elapsed time according to its own time clock, and can determine range by the subtracting from this total the telemetered delay and then dividing the remainder in half, since the remainder merely represents twice the two-way range propagation time. Regardless of whether the remote aircraft's clock is phase-synchronized or not it is assumed that both time clocks measure short-term elapsed time with a high degree of accuracy and similarity. In a similar manner, all other aircraft during the various unique time intervals transmit their marker pulses and telemetered delays to the other listening aircraft. The telemetered delay messages are always accompanied by an identification of the respective aircraft to which they are directed.

The present illustration of FIG. 2 shows cyclic time base lines divided into time slots which are uniquely occupied by various aircraft, but as pointed out in the objects of this invention, it is not necessary that the time slots be more than approximately phase-synchronized, or that they be assigned to aircrafts, in view of the fact that they can be randomly acquired by individual aircraft, as set forth in the above-mentioned Patent 3,161,869. The present invention does not depend upon time slots for its operation, but is described in terms of a preferred embodiment using such means for preventing two aircraft within range of each other from operating substantially simultaneously. A system of orderly sequential transmission by the various aircraft is more desirable than a system in which a number of aircraft can transmit at approximately the same time and thereby run the risk of serious confusion of data. In the practical example illustrated in FIG. 2 it is assumed that the time clocks in the various aircraft enjoy reasonable accuracy, such as might be provided by a $10^{-8}$ crystal oscillator. It is also assumed that there are 100 time slots, each including 10,000 microseconds, and together forming a repeating frame which is one second in duration. It is further assumed that the accumulated phase error among the time clocks in the various units which determine frames and time slots is less than 3,000 microseconds, an assumption which is very easily achieved by aircraft using a $10^{-8}$ clock which is synchronized on the ground prior to take-off.

FIG. 2 shows the beginning of four different frames, each one million microseconds in length and including 100 time slots. The first three horizontal base lines represent corresponding moments in the three different aircraft A, B, and C which are assumed to occupy the first three time slots (for the sake of making illustration easier). The first time slot according to the local clock in each of the three aircraft begins at time zero, and the boundaries of the subsequent time slots according to each horizontal base line are indicated in FIG. 2 by downwardly directed marks. However, it will be noted that according to B's time clock, his time zero actually begins 1,000 microseconds later than A's and 1500 microseconds later than C's, whose clock is 500 microseconds faster than A's and 1500 microseconds faster than B's. This phasing error is introduced to illustrate a general situation.

Since it has been assumed that the time clocks in the various units are only roughly synchronized, each unit allows 3,000 microseconds of its own time slot (according to its own time clock) to pass before transmitting its marker signal. In a practical embodiment each transmitted marker signal would comprise plural grouped pulses forming a coded signal, which coding can be the same for all aircraft and serves merely to distinguish marker pulses from the other pulses, including telemetered pulses, noise, etc. Each marker pulse transmitted is furnished with an upwardly pointed arrowhead in FIG. 2, and the reception of each such marker pulse is illustrated by a downward arrowhead and reduced pulse height. Each pulse is labeled with the letter corresponding to the transmitting unit. Thus, at the upper left-hand corner of FIG. 2, unit A allows 3,000 microseconds to pass and then transmits its coded marker signal when its own time clock reads 3,000. Looking now at the second base line down in FIG. 2 corresponding with unit B, it will be seen that because the range between A and B is 40 miles, B will actually receive A's signal 240 microseconds later, but because of the 1,000 microsecond difference between the reading of B's clock and A's clock, the moment of reception according to B's clock will be 2240 microseconds. The marker signal from A also will be received at C which is 32 miles away from A, and therefore the reception at C will be 192 microseconds after transmission at A. However, C's time clock is 500 microseconds faster than A's clock, and therefore the moment of arrival of A's signal will be 3692 microseconds. As will be described hereinafter, the various units include data storage devices for recording the moments of arrival and transmission of the various marker signals, and therefore units B and C will record in their storage devices entries showing the times of arrival of A's marker signal, however recorded in terms of readings of the local clocks in units B and C.

For the remainder of the first time slot, no further marker pulses are transmitted, and then the second time slot arrives, and this time slot is occupied by unit B. Unit B according to its own time clock notes that the second time slot commenced at 10,000 microseconds, and it permits a guard space of 3,000 microseconds to pass, and at the end of this guard space, B transmits its own marker signal labeled B and occurring at 13,000 microseconds as measured by B's local time clock. Since the range of 40 miles to unit A has not had time to change noticeably, A will receive B's marker signal 240 microseconds later. However, due to the fact that A's time clock is earlier by 1,000 microseconds than B's clock, unit A will note the time of arrival of B's signal as being 14,240 microseconds according to A's clock. Also B's marker signal travels the 24 miles to unit C in 144 microseconds, but because C's time clock is 1,500 microseconds earlier than B's time clock, C will record the time of arrival of B's signal as being 14,644 microseconds.

When the second time slot has passed and the third time slot arrives, it is occupied by unit C which notes that this time slot begins at 20,000 microseconds according to its local clock. It then waits 3,000 microseconds (guard space) and transmits its marker signal at its own clock reading of 23,000. B receives C's signal at 21,644 microseconds according to B's time clock and records this time of arrival; and A receives C's marker signal and records its time of arrival at A as 22,692 microseconds according to A's local time clock.

Moreover, the various aircraft during their own time slots transmit not only their own coded marker signals, but also telemeter a considerable amount of data, which data is necessary in order to make the transmitted marker signals useful to other aircraft, assuming that the various time clocks are only roughly synchronized, that is, well enough to preserve useful time slots. The preceding paragraphs have described the transmission of the marker signals from aircraft A, B, and C and the moments of reception of such marker signals at the other two aircraft, and the manner in which the other aircraft noted the various significant times, each using its own time clock exclusively. The telemetered information will now be described.

Each transmitting aircraft will telemeter two kinds of data within its own time slot. It will transmit information concerning its own identity, and it will transmit information from which the other aircraft can determine how much delay has been introduced between the moment of reception of the other aircraft's marker signal and the moment of initiation of the next succeeding marker signal from the transmitting aircraft. If this is a time slot system in which each aircraft is definitely assigned to occupy a particular time slot, for instance assigned by the airport prior to take-off, then each aircraft in the system will know the identity of a unit transmitting its marker signal by the time slot in which it transmits. However, for the purpose of describing a more general system, it is assumed that each unit has acquired a time slot, but that other units may not be able to identify each other by the time slots actually occupied. Therefore, each unit should telemeter its own identity shortly after it transmits its marker signal. The telemetering does not take place until a certain length of time, 2,000 microseconds, has elapsed after transmission of a marker signal so that the marked signal will have had time to arrive at distant units before the local unit begins telemetering. Since it is also very useful to know the altitude of all aircraft not only for ground control and anti-collision purposes, but also for the specific purposes of implementing my Matrix Navigation System described in the co-pending application Ser. No. 589,698, supra, FIG. 2 shows each aircraft transmitting its own altitude according to the standard method in which the air space is divided into 500 or more horizontal levels spaced at 100 feet each. For instance, the telemetered message appearing just after A's marker signal in the upper left-hand corner in FIG. 2 shows the altitude as "325," meaning 32,500 feet. It will be noted therefore that after the transmission of each marker signal, there appears a telemetered group setting forth the identity of the transmitting unit, its altitude, and in one practical embodiment the reading of its own time clock at the moment when it initiated its own marker signal, namely 3,000 for aircraft A, 13,000 for B, and 23,000 for C. Aircraft B telemetered its altitude as 31,000 feet and C transmitted its altitude as 26,500 feet.

The first three horizontal base lines in FIG. 2 show the starting up of a system from an initially dormant state, and therefore A is unable to transmit any information during its first telemetering interval near the left end of the top base line in FIG. 2, except to telemeter its own identity, altitude, and the reading of its clock at the moment it transmitted its own marker signal. However, by the time B's slot arrives B is able to telemeter more information. As shown in the middle of the second base line, B telemeters that it is unit B, at an altitude of 31,000 feet, that it transmitted is marker pulse at 13,000 microseconds (according to its own time clock), that it received from A the latter's marker signal at 2240 microseconds (according to B's clock). It cannot telemeter any information with respect to C because the latter has not yet transmitted its first marker signal.

As can be seen in FIG. 2 near the right end of the third base line, after C transmits its marker signal, it waits 2,000 microseconds and then telemeters the following information: Namely that it is unit C, at altitude 26,500 feet, that it transmitted is marker signal at 23,000 microseconds (according to its own time clock), that it received from aircraft A the latter's marker signal at 3692 microseconds, and that it received from aircraft B the latter's marker signal at 14,644 microseconds (all according to C's own clock).

The fourth base line in FIG. 2 shows the beginning of the second frame, and shows that in time slot 1 aircraft A again transmits its marker signal and is also able to telemeter complete information to the other aircraft as follows: Namely that it is aircraft A, at 32,500 feet, that it transmitted its marker signal at 3,000 microseconds (local time), that it received from B the latter's marker signal at 14,240 microseconds (local time), and that it received from C its marker signal at 22,692 microseconds according to A's time clock.

The telemetering of this type of data is very well-known in the prior art and is being used by the airlines at the present time employing a binary code. For instance, assuming a one-megacycle bit rate, ten bits is adequate to set forth the identity of an aircraft, ten bits is adequate to set forth an altitude, and 20 bits is adequate to set forth a clock reading. Therefore each aircraft needs only 40 bits for identifying itself, giving its altitude and giving the reading of its own time clock at the moment when it transmitted its marker signal. In addition, it needs 10 more bits each time it addresses another aircraft and telemeters to it the reading of the local time clock at the moment when the other aircraft's marker signal was received. Of course, there should be a spacing between each of these message components. If ten microseconds were allowed between each binary series representing a component, the amount of elapsed time would be almost doubled. For instance, as between the three aircraft in the example of FIG. 2, including the aforementioned intervals of separation between components, 160 microseconds would be used up in telemetering the information shown for instance near the left end of the fourth time base lines shown in FIG. 2. In the present example, each aircraft commences telemetering in the middle of its time slot, and it therefore has 5,000 microseconds available for this purpose. In a practical system, an aircraft would probably not reply to aircraft in all 100 time slots, but even assuming that it replied to 50 of them, it would still use up only 2560 microseconds of the available 5,000 according to the present example. Therefore, it should be apparent that the telemetering of the data is not a problem at all in a practical system using 100 times slots per frame and a one-second frame. In fact, there is enough lee-way in this example to greatly increase the number of time slots without undue crowding, and if the frame duration were increased from one second, for instance to ten seconds, the number of slots could be increased by a factor of 10:1, and still have the information transferred using an acceptable data acquisition rate.

The above description of FIG. 2 has described what information is transmitted between the various units A, B, and C for an embodiment in which all significant time clock readings are broadcast by all units. Now consider what is done with the information at each aircraft in order to put it to a useful purpose. As pointed out above, the total elapsed time betwen the transmission of A's coded marker signal and the reception at A of B's coded marker signal includes twice the range propagation time plus the number of microseconds that B delayed after reception of A's marker signal and prior to transmission of its own marker signal, this time being telemetered somehow from B to A so that A can complete its range calculation. In FIG. 2, the upper base line shows that the total elapsed time as measured by A's clock between transmission of its own marker signal and reception of B's marker signal is 14,240 minus 3,000 microseconds, namely 11,240 microseconds. Moreover, as seen in the middle of the second base line in FIG. 2, B telemetered the information to A that B had transmitted its own marker signal at 13,000 microseconds and that it had received A's marker signal at 2240 microseconds, representing a total delay of 10,760 microseconds. Therefore, of the 11,240 microseconds elasped time at A's time clock 10,760 microseconds represented B's introduced time delay, and only 480 microseconds represented two-way propagation time. Therefore, the one-way propagation time is equal to 240 microseconds, or 40 miles (using the approximation of six microseconds per mile propagation rate). It is important to note that by the time the first time slot has been completed during the second frame, as shown on the fourth base line in FIG. 2, every unit within radio range of A's and B's transmissions can determine the range betwen them even though they may not be synchronized with A's or B's time clocks. During the second frame, and every subsequent frame, A telemeters the total elapsed interval by telemetering the time when it transmitted its own marker signal and the time when it received B's marker signal. Moreover, B telemeters the total delay time of its signal response to A by telemetering the moment that it transmitted its own marker signal and the moment when it received A's marker signal, and these four moments are all that are required at any listening station to determine range between units A and B.

Moreover, the system also has a built-in redundancy, in view of the fact that all aircraft can figure the range between A and B, not only as set forth in the preceding paragraphs, but also in the following different manner. Each of the four base lines shown in FIG. 2, and representing a portion of a frame at one of the aircraft, can be thought of as being a closed circle rather than a straight line because it represents a repeating time cycle one million microseconds in length. Therefore, consider the telemetered information from the point of view that B transmits its marker signal at 13,000 microseconds and then awaits a reply from A. B therefore waits from 13,000 on its own time clock to one million plus 2240, namely the next instant when the marker signal is received from A. Therefore the total elapsed time is equal to (1,000,000 − 13,000 + 2,240). Moreover, the delay introduced by A and telemetered to B, as can be seen from the top or the bottom base line in FIG. 2 is (1,000,000—14,240+3,000).

Now, it is known that the two-way range propagation time is equal to the first parenthetical quantity above (1,000,000—13,000+2,240) minus the second parenthetical quantity, or (1,000,000—14,240+3,000). When this quantity is added up to produce a single figure, it is very interesting to note that both of the one million quantities always cancel out, and therefore the two-way range time can be determined at all times by taking the absolute value of the delay between a marker signal transmitted and a received marker signal according to one aircraft's time base and determining the difference between that quantity and the absolute value of the time between transmission and reception of the corresponding marker signals according to the other aircraft's time base. Completing the above mathematical presentation, after the two one-million values are canceled out the two-way range delay is found equal to (—13,000+2,240+14,240—3,000)=+480 microseconds, which again becomes 240 microseconds one-way propagation time.

In a similar way it can be shown that the range between B and C is equal to (21,644—13,000—23,000+14,644) which is equal to 288 microseconds (two-way propagation time). The one-way propagation time is 144 microseconds, or 24 miles. Finally, the range between A and C is equal to (22,692—3,000—23,000+3,692), or 384 microseconds (two-way range). The one-way range is therefore 192 microseconds, or 32 miles.

Therefore after two frames of one second each, every aircraft can determine the range between every other pair of aircraft whose telemetered messages it can receive, by a simple process of addition and subtraction. Reduced to its simplest terms, this is accomplished by taking the telemetered information from the first aircraft and determine the absolute value of the difference between the moment of its own transmission and the moment at which it receives the signal from the second aircraft to determine one absolute value of elapsed time, and then doing the same thing with the telemetered data from the second aircraft, namely determining the absolute value of the elapsed time between its moment of signal transmission and the moment when it received the marker signal from the first aircraft, and then determining the absolute value of the difference between the above-stated values. This latter difference is the two-way range between the two aircraft and when divided in half gives the one-way propagation time.

It is most important to note that this one-way propagation time contains no clock phase error whatever, and the only error involved is the amount of error introduced by $10^{-8}$ time clocks over an interval of less than one second, which error is virtually immeasurable. Thus, the present system provides extremely accurate measurements of ranges. In discussing the above calculations it has always been assumed that the time clocks of the various aircrafts had a sufficient degree of phase synchronization that their cumulative errors would not cause the marker signal from one aircraft to reach another aircraft in a different time slot. With time clocks having a $10^{-8}$ accuracy, an aircraft departing from an airport with a newly synchronized time clock would develop a maximum error during a ten hour flight of $10^{-8} \times 60 \times 60 \times 10 = 360$ microseconds. Thus, the present system described in FIG. 2 includes very large guard spaces in each time slot as compared with the largest error expected.

It is also very important to note that once the actual range has been established between a number of aircraft with a great degree of accuracy, it is relatively easy to adjust time clocks during flight to remove therefrom the drift errors and produce accurate phase synchronization of all clocks. As pointed out above, such phase synchronization is not necessary, but it is easily available with the present system if for some reason it should be desired in order to meet needs other than those set forth herein. For instance all units may be phase synchronized to a selected master clock. If desired steps may be taken to prevent reception of marker pulses from very distinct aircraft, i.e., where a marker pulse might travel far enough to be received in an incorrect time slot. The prior art includes means adequate for this purpose.

The same pulse transmitter which is used to transmit the coded pulse group comprising an aircraft marker signal can also transmit the binary code comprising the telemetered components of information. The description of operation given between the units A, B and C set forth above need not assume that all three units are aircraft or mobile, but also applies to the case where some of the units are ground stations or weather ships.

There is an alternative system illustrated in FIG. 3, which is quite workable and similar to that set forth in FIG. 2. It has the advantage of being slightly simpler than the system shown in FIG. 2, but at the expense of losing the ability of each aircraft to determine ranges between all other aircraft simply by listening to their telemetered messages. In this alternative system, a unit does not telemeter its own clock reading at the moment when it transmits its marker signal, nor does it transmit to each other unit its own clock reading at the instant when it received the other unit's marker signal. Instead, it computes and transmits the difference between these two clock readings, which difference is the absolute value of the amount by which the local unit delayed before replying to the remote unit's signal. Thus, the telemetered message, for example from A as shown in FIG. 3, would read "This is A—altitude 32,500 feet—the signal from B—delayed 988,760 microseconds—the signal from C—delayed 980,308 microseconds." In othe words A would do the subtraction before passing the telemetered message back to B and C in this embodiment, whereas in the prior embodiment A would transmit its own instant of transmission plus its own time clock readings when the other unit's signals were received and let the other units determine the differences between them.

*Block diagram*

Referring now to FIG. 4, this block diagram schematically illustrates the functioning of a typical unit, located for instance in an aircraft. The particular unit illustrated is set up to operate in the second time slot, and therefore corresponds with unit B as illustrated in FIG. 2. FIG. 4 and FIG. 2 can be read together and are intended to be mutually consistent. The illustrated unit is provided with omnidirectional antennas 10 and 12, which in a practical system may comprise the same antenna coupled through an appropriate duplexer to a transmitter 14 and a receiver 16. All of the units participating in this system can operate at the same carrier frequency. The unit is further provided with a time clock oscillator 18 which in the present numerical example delivers pulses at the rate of one mHz, and as in the example described in connection with FIG. 2 this oscillator has an accuracy of $10^{-8}$. For purposes of the present discussion, it is assumed that this oscillator has been synchronized with other oscillators in the system closely enough to maintain time slots such that the total error accumulated within a flight will not be great enough to cause displacement of the time slot boundaries outside of the guard space of 3,000 microseconds as shown in FIG. 2.

These one megacycle pulses are converted to binary type output by a chain of flipflops 20 in a manner which is well-known per se, the output of these flipflops being connected to a time slot logic circuit which provides a repeating frame cycle every second, and which divides each frame into 100 time slots of 10,000 microseconds each. Two different modes of operation are performed by each unit depending upon whether the unit is performing in its own time slot (#2 in the present illustration) or whether the unit is performing in a time slot occupied by another unit. During an unoccupied time slot, the units neither record nor transmit. During its own time slot each unit transmits its own marker pulse, and then telemeters certain information to other units within range. During a time slot occupied by another unit, the present unit does not transmit, but receives and stores the time of arrival of the marker signal transmitted by the other unit and then receives and stores the data telemetered by the other unit.

Considering now the mode of operation performed by each unit in its own time slot, the beginning of the unit's time slot (#2 in the present illustration) is indicated by an output on the wire 23 at 10,000 microseconds which is the beginning of the second time slot (according to unit B's clock), the clock comprising the units 18, 20, and 22. This output signal is delayed 3,000 microseconds by the delay circuit 26, which then delivers a pulse to the transmitter control unit 28, causing it to encode B's marker signal comprising a pulse group having an indefinite width and spacing. For instance, a typical group could comprise a pair of two-microsecond pulses spaced by a two-microsecond gap. The marker signal encoded by each unit is the same, and the encoding merely serves to avoid confusion of this marker signal with other types of pulses which may be received from other non-significant sources. Then, 3,000 microseconds after the beginning of slot #2 the transmitter 14 transmits the marker signal of unit B. For the next 2,000 microseconds, according to the present example, unit B transmits nothing, thereby providing an interval of time sufficient to permit propagation of its marker signal to other units, and a quieting of any multipath reflections. The chain of flipflops 20 is also connected to a 20-bit encoder 30 which encodes a 20-bit binary signal indicating the actual reading of unit B's time clock at the moment when it transmitted its marker signal. This encoded signal is labeled M and is delivered through the wire 32 to its own computer and storage system 100.

When the transmitter control 28 actuated the transmitter to deliver the unit B's marker signal, it also actuated a 2,000 microsecond delay circuit 34, which at the end of 2,000 microseconds actuates the telemetry encoder 36, causing it to commence telemetering the data needed by other aircraft in order to determine their ranges to unit B. The operation of this telemetry encoder 36 will be discussed more fully after the receiving and data storage functions of the system have been described, infra.

Each unit is provided with a data storage memory bank which for the sake of clarity has been shown as individual modular memory devices containing the information which they are storing according to the operating sequence shown in FIG. 2. The data storage memories include in the present example six horizontal rows of memory devices. The uppermost row includes the devices 40, 42, 44, 46 and 48 representing 100 separate memory devices, each one of which is capable of storing the reading of the local time clock at the moment when the marker signal of another unit was received, although it stores its moment of marker signal transmission in its own time slot memory devices 42 for reasons set forth below. The local time clock readings which are labeled signal L and comprise the binary outputs of the encoder 30 are applied to the other memory devices 40, 44, 46, and 48, one at a time, since only one of the memory devices is rendered operative to record the encoder information at any one instant of time, namely when that column of memory devices is rendered operative by a time slot enable signal on one of the wires 21, 23, 25, 27, or 29. Thus, if during time slot #1 the receiver 16 receives unit A's marker signal, it delivers an output on wire 17 to the marker signal decoder 38, which then delivers an output signal on wire 39 to actuate the binary encoder 30 which then delivers a binary signal L which is recorded in memory device 40, indicating that unit B received unit A's marker signal at 2,240 microseconds according to B's own time clock. In time slot #3 the same wire 39 would enable the binary encoder 30 to deliver an output signal L, but this time the signal would be recording in memory device 44, showing that unit B received unit C's marker signal at 21,644 microseconds according to B's time clock. As stated above, in its own time slot unit B records the moment of transmission of its own marker signal just as though it had received it zero-time after its own transmission.

The second horizontal row of memory devices includes 50, 52, 54, 56, and 58, and these memory devices are used to store computed ranges to other units in microseconds, as determined by the computer 100 in a manner described hereinafter.

The third horizontal row of memory devices 60, 62, 64, 66, and 68 stores telemetered data received from other units. The output 17 of the receiver 16 is delivered to a telemetry readout circuit 19 which has four different outputs. The telemetry readout 19 includes a circuit sensitive to unit B's encoded identifications when received from another unit, which circuit when actuated enables the subsequent twenty-bit binary time clock reading telemetered from other aircraft to be recorded in the appropriate memory devices 60–68. In other words, when a remote aircraft says "unit B's signal received" the appearance of unit B's identity in the message enables the reading out from the telemetry unit 19 of the signal labeled S and this signal is applied to the memory devices 60, 64, 66, and 68, but it is only recorded in whichever one of these units has been enabled by a time slot signal 21, 25, 27, or 29. Thus, in time slot #1, the telemetered message from unit A will record in memory device 60 that unit A received unit B's marker signal at time 14,240, according to A's time clock. In time slot #2 unit B receives nothing and therefore nothing is recorded in memory device 62. In time slot #3, unit B records the telemetered message from unit C stating that the latter received unit B's marker signal at 14,644 microseconds according to C's time clock, and so on.

The fourth horizontal row of memory storage devices labeled 70, 72, 74, 76, and 78 are used to record the time when a remote unit says that it transmitted its own marker pulse, according to its own time clock. As stated above, when describing FIG. 2, the telemetered message from a remote aircraft includes the identity of the aircraft, its altitude, the time T it transmitted its own marker signal and the arrival time S of each remote unit's marker signal, all according to its own time clock. Therefore, when the receiver delivers a telemetered message to the telemetry unit 19 this unit records the time T that the remote unit indicates that it transmitted its own marker signal. During time slot #1 the memory device 70 is enabled and records that A transmitted its own marker signal at 3,000 microseconds according to A's time clock. During the time slot #2 unit B received nothing, and therefore it recorded nothing in storage device 72. In time slot #3 it received the telemetered information that C transmitted its marker signal at 23,000 microseconds according to C's clock, which information is recorded in memory device 74, and so on.

Referring now to the memory devices 80, 82, 84, 86, and 88, the receiver 16 delivers the telemetered information from a remote aircraft in the latter's time slot, and this information includes that unit's identity. The present system shows that the various identities are recorded in memory devices 80 through 88, respectively, and this information may or may not be redundant, depending upon whether or not the time slots are uniquely assigned to the aircraft according to a predetermined agreement so that each aircraft knows the identity of the other aircraft in every time slot. On the other hand, redundancy is considered useful in avoidance of errors, and therefore the transmission by each aircraft of its identity and the recording thereof by each other aircraft is desirable. Moreover, the transmission of its own identity and the recording thereof at other remote aircraft provides a more flexible system since it removes the necessity of specifically assigning a particular preselected time slot to each aircraft. The system illustrated in FIG. 4 uses 600 memory devices on the assumption that each aircraft is capable of keeping track of information relating to the other aircraft in as many as 100 time slots. On the other hand, if an assumption can be made as to the maximum number of aircraft which would be likely to appear within radio range of any particular unit, then the number of memory units could be reduced from 100 columns, for instance to 10 or 20 columns, and means could be provided for assigning a memory column to a particular aircraft when it intrudes within the radio range of the present unit, and later making that memory column available to some other aircraft after the intruder has passed out of radio range, and has perhaps been replaced by another. Such a system is not actually illustrated in the present disclosure, but it suggests one practical alternative for reducing the computer capability required within each of the units.

The horizontal row of memory devices labeled 90, 92, 94, 96, and 98 is also an optional row serving to record the altitude of each other transmitting unit telemetered by the latter in its own time slot. The receiver picks up this telemetered data and delivers it to the telemetry readout unit 19, which then delivers the signal into the bottom row of storage devices and records it in the appropriate column under the time slot in which it was received.

The computer 100 is shown as a formula in FIG. 4 which performs the arithmetic function of determining (according to B's local time clock) how many microseconds elapsed between the moment when B received the remote aircraft's marker signal, moment L; and the moment when B's own marker signal M was transmitted in response to all of the remote units' marker signals. Thus, the moment L minus the moment M becomes the total elapsed time between the moment when unit B sent out its marker signal and the moment when it received the remote unit's marker signal according to B's time clock. It will be recalled that by subtracting from this elapsed time interval the telemetered delay introduced by the remote unit, the two-way range propagation time is obtained. The amount of delay introduced by the other aircraft is the parenthetical expression $T-S$, namely the time at which the remote unit transmitted its own marker signal minus the time when it received unit B's marker signal, all according to the remote unit's time clock. In view of the fact that $L-M-(T-S)$ is equal to the two-way range propagation time, this quantity must be multiplied by one-half to obtain the one-way propagation time, and this time comprises the output of the computer is microseconds, which can be recorded and/or displayed by the memory devices 50, 54, 56, and 58. On the other hand, if it is desirable to display the range in miles, the one-way propagation time in microseconds would be divided by six (approximately) to obtain the range in miles.

As indicated above, unit B delays 3,000 microseconds after the beginning of its own time slot #2, and then transmits its marker signal. Then, the delay unit 34 introduces 2,000 more microseconds delay, after which the telemetry encoder 36 transmits data messages to all other aircraft. The encoder 36 includes means for composing B's identity into a ten-bit binary code, and this signal is transmitted by way of the transmitter 14 through the wire 11. Subsequently, the local digital altimeter transmits B's altitude through the wire 13. Then B transmits the time that it sent out its own marker signal (according to its own time clock), this information being taken by the wire 15 from the memory storage device 42, namely 13,000 microseconds. Then, unit B transmits A's identity taken from memory device 80 by way of wire 81, subsequently transmitting the time when A's marker signal was received at B according to B's time clock, namely 2,240 microseconds according to B's time clock and taken from memory device 40 by wire 15. Next, B transmits C's identity taken from memory device 84 by wire 81, and then transmits the time according to B's clock when B received C's marker signal, namely 21,644 microseconds taken from memory device 44 via wire 15, and so on.

Just prior to the portion of the present disclosure marked "Block Diagram," a modification was described in which the units do not record and telemeter the information labeled S and T in the memory device 60–68 and 70–78; but instead, each unit performs a subtraction of data S from data T and then transmits the resulting difference, this difference representing the interval of time delay at each remote unit between the time when the remote unit received B's marker signal and the time when the remote unit replied thereto with its own marker signal. The present system could therefore be very easily modified by adding a subtracting capability and by omitting one of the horizontal rows of memory devices, either 60–68 or 70–78, and using the other row to record the computed difference signals, including those telemetered from other units.

The embodiment illustrated in FIG. 4 permits aircraft B to determine range between itself and all other aircraft with which it exchanges specific data, but it does not permit aircraft B to determine range between other aircarft merely by listening to times of arrival and transmission being exchanged directly between those other aircraft. In order to have this capability, additional storage devices are necessary which would store the telemetered times of arrival and transmission which are exchanged directly between the other aircraft, but not including B in their mutual conversations. These storage devices should contain the received identities of all overhead first transmitting aircraft, their times of transmission, and the times of their reception of identified second aircraft's marker pulses. Moreover, they should record the remainder of the overhead exchange including the time of transmission of said second aircraft's marker pulse and the time of reception of the first aircraft's marker pulse at the second aircraft. This additional data is then processed in the same range computer 100 as is used for solving the local range data, $L-M-(T-S)$ divided by two. These additional storage devices would be entered, or addressed, by the identification associated with each overhead telemetered message.

A logical extension of the technique discussed in the last preceding paragraph would be to have each unit relay to a central computer all of the data in its storage devices which was gathered by taking readings of its own time clock so that the central computer can determine ranges and plot a complex geometric figure including the relative positions of all participating units. For this purpose it may be simpler to transmit to the central computer from each remote unit an analog pulse-position train of data representing the instant of transmission of the local marker signal and the instants of local reception of other unit's marker signals. Such an analog sequence from each unit might be condensed timewise into a train which could be read out to the computer during the unit's own time slot.

The present invention is not to be limited to the exact forms shown and/or discussed, for obviously changes may be made within the scope of the following claims.

I claim:
1. The method of determining range between units having their own time clocks measuring elapsed times at similar rates, including the steps of:
   (a) transmitting a pulse signal from a first unit and noting its time of reception at a second unit according to the latter's own time clock;
   (b) subsequently transmitting a pulse signal from the second unit and noting its time of reception at the first unit according to the latter's own time clock;
   (c) determining according to the first unit's clock the elapsed time between transmission of its own signal and reception of the second unit's signal;

(d) determining according to the second unit's clock the delay time between reception of the first unit's signal and the transmission of its own pulse signal; and (e) subtracting said delay time from said elapsed time to determine a time proportional to the signal propagation time between units.

2. The method set forth in claim 1, including the steps of telemetering from each unit to the other unit the times according to the telemetering unit's clock when it transmitted its own pulse signal and when it received the other unit's pulse signal.

3. The method set forth in claim 2, including the steps of receiving the said telemetered times at a third unit, and differencing the respective telemetered delay times and the telemetered elapsed times to determine said time proportional to the signal propagation time between said first and second units.

4. The method set forth in claim 1, including the steps of telemetering from each unit the said delay time according to the telemetering unit's clock and comprising the difference between the reception of the other unit's signal and the next transmission of the telemetering unit's next pulse signal as computed at the latter unit.

5. The method of determining range between units having their own time clocks measuring increments of time at similar rates, including the steps of:

(a) transmitting from each unit at a unique moment of time a pulse signal for marking the present position of the transmitting unit;

(b) receiving at each unit the transmitted pulse signals of the other units, and noting the times of their respective receptions according to the local time clocks;

(c) telemetering data from each unit including the readings of its own time clock when it transmitted its own pulse signal and when it received the respective pulse signals from other units; and (d) collecting the telemetered data, and computing the ranges between the respective units by determining from said times of transmissions and receptions the signal propagation times therebetween.

6. The method of determining the ranges between multiple units each having its own time clock and the units performing their functions in a cyclically repeating sequence, including the steps of:

(a) transmitting a pulse signal from each unit during a uniquely occupied interval of said cyclic sequence;

(b) receiving the pulse signals from other units during remaining intervals in said sequence;

(c) telemetering from each unit during its uniquely occupied interval information defining the delay time it introduced between reception of at least one of the other remote unit's pulse signals and the next transmission of its own pulse signal; and (d) computing at each remote unit the range to at least one of the telemetering units by determining according to the local time clock the elapsed time between reception of the telemetering unit's pulse signal and the previous transmission of its own, and subtracting from said elapsed time the delay time introduced by the telemetering unit, to obtain a time proportional to the range to the telemetering unit.

7. The method as set forth in claim 6, including the steps of telemetering said information from each unit just after transmission of its pulse signal and including in said information its identity, its clock reading at the moment of its transmission, its earlier clock readings when it received other units' signals and the identity of the units whose signals were received.

8. The method set forth in claim 7, including the steps of receiving said telemetered clock readings at a third unit, computing from said telemetered information the elapsed time and the delay time relating to pairs of transmitting and receiving units, and differencing said elapsed and delay times to determine a time proportional to the range therebetween.

9. The method as set forth in claim 6, including the steps of telemetering said information from each unit just after transmission of its pulse signal, and including in said information its identity and the identities of at least some of the other units, the latter being each accompanied by locally-determined differences in time between reception of such other units' pulse signals and the subsequent transmission of its own.

10. A system for determining mutual ranges between plural units each sequentially performing during uniquely occupied intervals of time in a cyclically repeating sequence, comprising:

(a) means in the units for maintaining the cyclic sequence of the intervals;

(b) clock means in the units for accurately measuring increments of time of as great duration as the length of one cyclic sequence;

(c) means in each unit for transmitting a pulse signal during its own interval;

(d) means for receiving pulse signals transmitted by other units during other intervals;

(e) means for storing in each unit data defining the instants of signal transmission and signal receptions according to its own clock means;

(f) means in the units for exchanging said stored data and for storing the data received from other units; and (g) means for computing from said data the mutual ranges between the units by computing the pulse propagation times therebetween.

11. In a system as set forth in claim 10, said means for determining mutual ranges including means for determining according to the clock means in a first unit the elapsed time between transmission of its own pulse signal and receipt of a second unit's subsequent pulse signal; and including means for determining according to the second unit's clock means the delay time between receipt thereat of the first unit's pulse signal and the next transmission of the second unit's pulse signal; and means for subtracting said delay time from said elapsed time to obtain a time proportional to the pulse propagation time between the first and second units.

12. In a system as set forth in claim 10, said exchanging means comprising means in each unit for telemetering to other units data indicating the local clock-means readings when it transmitted its own pulse signal and when it received pulse signals from other units, and said means in each unit for storing the telemetered data received from other units including means for identifying the stored clock-means readings.

13. In a system as set forth in claim 12, at least some of the units further including means for receiving and storing clock readings exchanged by and between other pairs of units, and means for differencing the received data concerning said other pairs to determine propagation times proportional to the mutual ranges therebetween.

14. In a system as set forth in claim 10, said exchanging means comprising in each unit for telemetering to other units data indicating the delay time according to the telemetering unit's clock means between reception of the other unit's pulse signal and the transmission of the telemetering unit's next pulse signal; and means for identifying the unit to which each telemetered delay time relates.

15. In a system as set forth in claim 10, said exchanging means including means at each unit for telemetering data including its own identity, the instant according to its own clock means when it transmitted its own pulse signal, the identity of at least one other unit, and the instant when it received each such identified unit's pulse signal according to the telemetering unit's clock means.

16. In a system as set forth in claim 10, said exchanging means including means at each unit for telemetering data including its own identity, the identity of at least one other unit and the time delay according to the telemetering unit's clock between receipt of such other unit's signal and the transmission of the telemetering unit's next pulse signal; and means for storing telemetered data received from such other units.

17. The system as set forth in claim 10, wherein at least some of the units are in aircraft, altimeter means in each aircraft connected to said data exchanging and storing means to transmit to other units the altitude of the transmitting aircraft.

References Cited

UNITED STATES PATENTS

| | | | |
|---|---|---|---|
| 2,845,621 | 7/1958 | Hasbrook | 343—6.8 X |
| 3,204,237 | 8/1965 | Overcash | 343—6.5 |
| 3,312,971 | 4/1967 | Gehman | 343—6.5 |
| 3,336,591 | 8/1967 | Michnik et al. | 343—6.5 |

RODNEY D. BENNETT, *Primary Examiner.*

M. F. HUBLER, *Assistant Examiner.*